United States Patent [19]

Masaki

[11] Patent Number: 4,914,986

[45] Date of Patent: Apr. 10, 1990

[54] SHIELD WIRES REMOVING MACHINE

[75] Inventor: Takashi Masaki, Tokyo, Japan

[73] Assignee: Hirose Electric Co., Ltd., Tokyo, Japan

[21] Appl. No.: 357,293

[22] Filed: May 26, 1989

[30] Foreign Application Priority Data

Jul. 26, 1988 [JP] Japan .................. 63-184540

[51] Int. Cl.⁴ .............................................. H02G 1/12
[52] U.S. Cl. ....................................................... 81/9.51
[58] Field of Search .................... 81/9.51, 9.4, 9.41, 81/9.42

[56] References Cited

U.S. PATENT DOCUMENTS

| 2,988,940 | 6/1961 | Folkenroth et al. | 81/9.51 |
| 3,085,455 | 4/1963 | Hurlbut et al. | 81/9.51 |
| 3,139,778 | 7/1964 | Bielinski et al. | 81/9.51 |
| 3,153,358 | 10/1964 | Havens | 81/9.51 |
| 3,171,306 | 3/1965 | Mirsch | 81/9.51 |

FOREIGN PATENT DOCUMENTS 0068993 6/1979 Japan ..................... 81/9.51

Primary Examiner—Roscoe V. Parker
Attorney, Agent, or Firm—Kanesaka & Takeuchi

[57] ABSTRACT

A shielding wires removing machine for automatically removing a desired length of shielding wires from a shielded cable, which includes a blade body secured to the base and having a blade aperture whose edge forms a circular blade; a movable sleeve able to slide in the blade aperture along a longitudinal axis; a movable cable holder provided in front of the fixed blade body and having a holding aperture and a shield guide concentrically about the longitudinal axis, the shield guide having a diameter sufficiently large to receive an exposed shield portion of the shielded cable but too small to receive the shielded cable; a pressure bar disposed in a side hole provided at right angles to the holding aperture for holding by pressure the shielded cable in place within the holding aperture; and a movable clamp provided behind the fixed blade body and having a plurality of clamp elements movable in radial directions to form a variable opening concentrically about the longitudinal axis.

6 Claims, 3 Drawing Sheets

SHIELD WIRES REMOVING MACHINE

BACKGROUND OF THE INVENTION

The present invention relates to shield wires removing machines.

When a shielded cable having flexible shielding wires between the core wires and the sheath is wired, it is necessary to remove desired lengths of sheath and shielding wires. Such operation has been performed manually by using a nipper or the like.

The sheath is thick and soft so that it is easy to remove with a nipper, but it is difficult to remove shielding wires with a nipper because they are fine and flexible and knitted into a net. In addition, there is always a danger that the dielectric or core wires are broken by the nipper. Therefore, it has been a common practice to separate a net of shielding wires from the core wires with a needle-like tool before the separated shielding wires are cut in front of the end of the sheath. Such operation has kept the productivity low.

SUMMARY OF THE INVENTION

Accordingly, it is an object of the present invention to provide a shielding wires removing machine capable of removing automatically a desired length of shielding wires, thus increasing the efficiency of the operation.

According to the invention there is provided a shield wires removing machine having a cable holder with a holding aperture, a sleeve movable through a blade body, and a clamp with an opening all arranged concentrically about an axial line for receiving and removing a length of exposed shield wires from a cable which has core wires, flexible shield wires, and a sheath. In the shield wires removing machine, the cable holder is movable along the axial line, and the holding aperture has a diameter sufficiently large to receive a cable. A pressure bar is provided at right angles to the holding aperture for holding by pressure the cable in place within the holding aperture. A shielding wires guide communicates with the holding aperture via a shoulder portion and has a diameter substantially equal to a diameter of exposed shield portion. A cylindrical flange is provided at an end of the shielding wires guide and is able to abut the sleeve.

The blade body has an opening whose edge forms a circular blade in which the cylindrical flange is able to fit. The sleeve has a diameter sufficiently large to receive the exposed shield portion. The clamp is movable along the axial line and has elements which are movable in radial directions to at least two positions; a first position where they catch the exposed shield portion with core wires therein and a second position where they catch an exposed shield portion with no core wires therein.

The above shielding wires removing machine operates as follows:

(1) First of all, a desired length of sheath is removed from the cable to expose a shield portion.

(2) The cable is inserted into the holding aperture until the cut edge of the sheath abuts the shoulder between the holding aperture and the shield wires guide. As a result, the exposed shield portion goes through the sleeve and the clamp.

(3) The pressure bar is then actuated to hold by pressure the cable in place within the holding aperture while the clamp is actuated to clamp the front end of the exposed shield portion.

(4) Then, the clamp and the sleeve are moved toward the cable holder so that the shielding wires slide over the core wires and expand in radial directions through a space between the sleeve and the cable holder.

(5) The cable holder is then moved toward the sleeve so that the cylindrical flange enters the circular blade to cut off the expanded shield wires which project from the sleeve.

(6) The pressure bar is then released, and the cable is removed from the cable holder to provide the finished cable from which the exposed shielding wires have been cut off. By releasing the clamp, it is easy to discharge by hand, for example, the shielding wires which remain in the sleeve.

Other objects, features, and advantages of the invention will be apparent from the following description when taken in conjunction with the accompanying drawings.

DESCRIPTION OF THE PREFERRED EMBODIMENT

Figure 1:
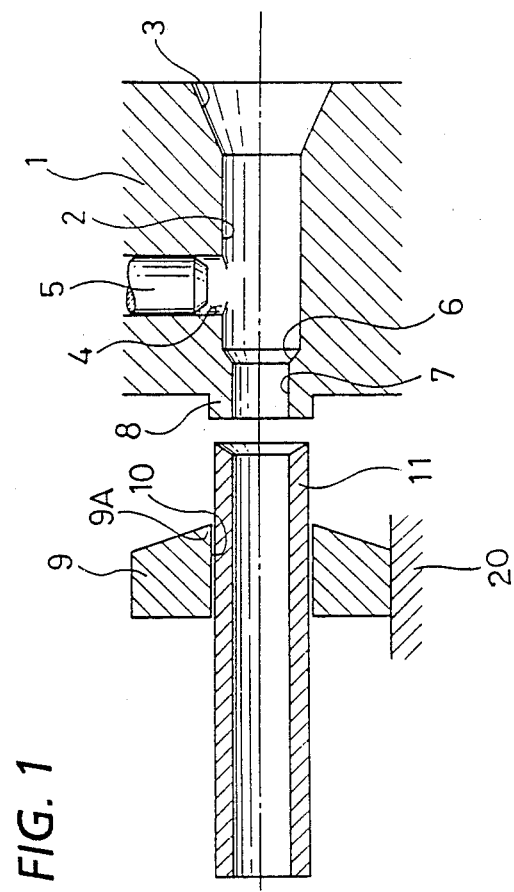
FIG. 1 is a sectional view of a shield wires removing machine according to an embodiment of the invention.

In FIG. 1, a cable holder 1 is provided so as to be movable along an axial line P. The cable holder 1 has a holding aperture 2 into which a sheathed cable may be inserted through a tapered mouth 3. A side hole 4 is provided at right angles to the holding aperture 2. A movable bar 5 is placed in the side hole 4. A shielding wires guide 7 with a diameter slightly small than that of the holding aperture 2 communicates with the holding aperture 2 forming a tapered shoulder 6 therebetween. A cylindrical flange 8 is provided at the outlet of the shield guide 7.

A movable sleeve 11 is able to slide in the hole 10 of a fixed blade body 9 along the axial line P. The blade body 9 is secured to a base 20 of the machine. When the cylindrical flange 8 of the cable holder 1 enters the hole 10 of the blade body 9, the circular edge 9A serves as a blade. The inside diameter of the sleeve 11 is made sufficiently large to receive the exposed shield portion of a cable, and the length of the sleeve 11 is set such that a small length of the exposed shield portion project from the sleeve 11.

Behind the sleeve 11 there are provided a clamp 12 and a receiver 13. This receiver may be eliminated by providing the clamp 12 closely to the sleeve 11. The clamp 12 is movable in the axial direction P along with the receiver 13 and has a plurality of clamp elements 12A, 12B each having a V- or U-shaped front end. These clamp elements are movable in radial directions in a plane perpendicular to the axial line P. More specifically, these clamp elements are movable to three positions; the first position where they catch the exposed shield portion having core wires therein, the second position where they release the exposed shield portion, and the third position where they catch the shielding wire net having no core wires therein. The receiver 13 has a receiving aperture 13A with a diameter substantially equal to the inside diameter of the sleeve 11 for receiving the exposed shield portion. A discharging rod 14 is provided behind the receiver 13 so as to reciprocate into and out of the receiving aperture 13A. This discharging rod may be eliminated.

A method of treating a shielded cable will be described with reference to FIGS. 2(A) through 2(J).

(1) A desired length of sheath is removed from the cable by the conventional method described above.

Figure 2A:
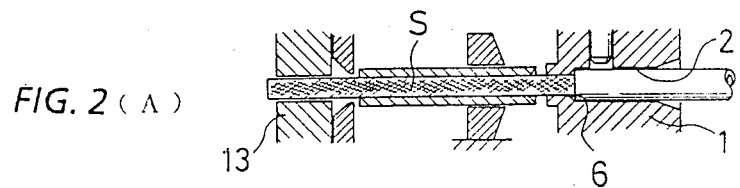
FIGS. 2(A) through 2(J) shows steps of a method of removing shielding wires from a shielded cable.

(2) As shown in FIG. 2(A), the cable is inserted into the holding aperture 2 until the cut edge of the sheath abuts the shoulder 6. At this point, the respective sections of the machine are disposed closely so that the front end of the exposed shield portion S readily goes through the receiver 13.

Figure 2B:
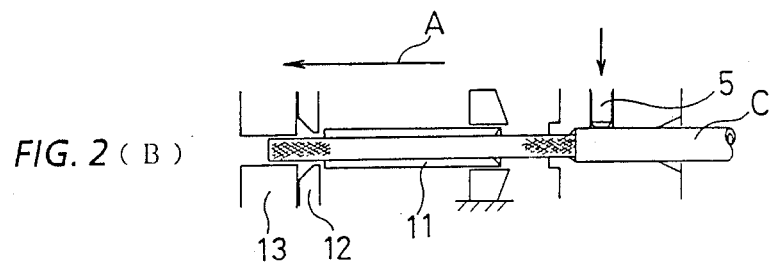

(3) As shown in FIG. 2(B), the pressure bar 5 is then actuated to hold by pressure the cable in place. The sleeve 11, the clamp 12, and receiver 13 are then moved to the left or in the direction A.

Figure 2C:
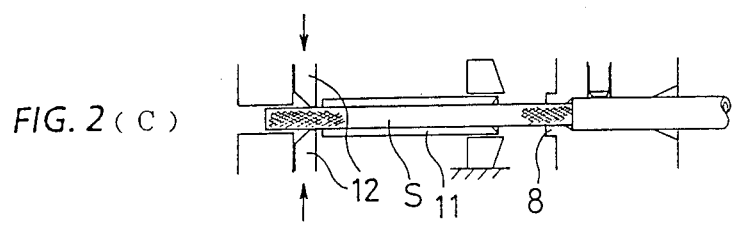

(4) As shown in FIG. 2(C), the clamp 12 is then actuated to clamp the front end portion of the exposed shield portion S.

Figure 2D:
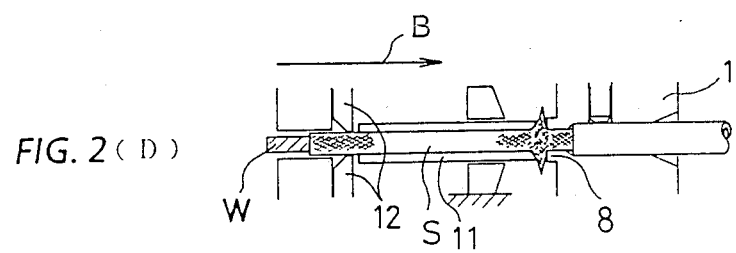

(5) As shown in FIG. 2(D), the sleeve 11, the clamp 12, and the receiver 13 are moved to the right or in the direction B until the right-hand end of the sleeve 12 abuts the cylindrical flange 8 via expanded shielding wires. That is, the shielding wires slide over the core wires W, and excessive wires escape outwardly through the space between the sleeve 11 and the cylindrical flange 8.

Figure 2E:
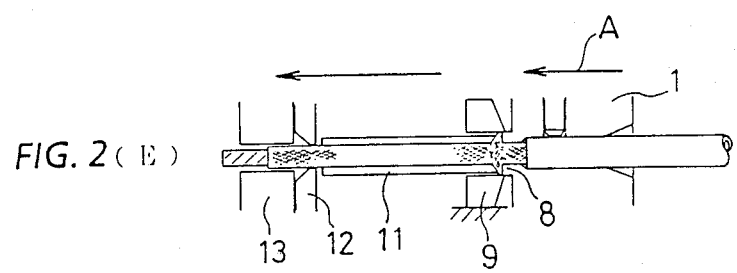

(6) As shown in FIG. 2(E), the cable holder 1, and the sleeve 11, the clamp 12, and receiver 13 are moved in the direction A at the same speed for the same distance so that the cylindrical flange 8 enters the circular blade 9 to cut off the expanded shielding wires.

Figure 2F:
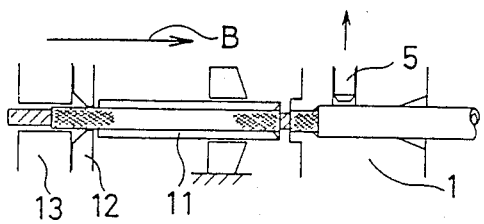
Figure 2G:
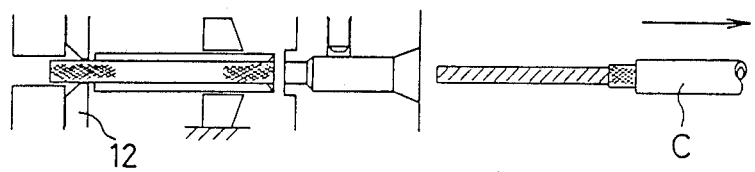

(7) As shown in FIG. 2(F), the cable holder 1, the sleeve 11, the clamp 12, and receiver 13 are then returned to the position of FIG. 2(D), and the pressure bar 5 is released. Then, as shown in FIG. 2(G), the cable C is removed from the cable holder 1 while the exposed shield portion is held in the sleeve 11 by the clamp 12.

Figure 2H:
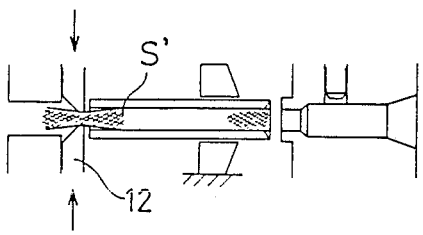
Figure 2I:
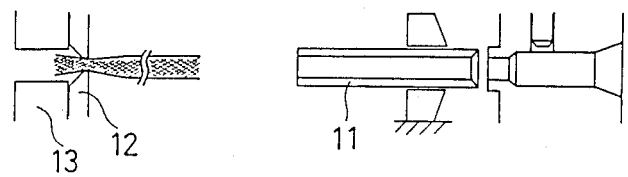

(8) As shown in FIG. 2(H), in order to dispose of the remaining shielding wires S', the clamp 12 is further closed. As shown in FIG. 2(I), the clamp 12 and the receiver 13 are then moved away from the sleeve 11 to pull the remaining shielding wires S' out of the sleeve 11.

Figure 2J:
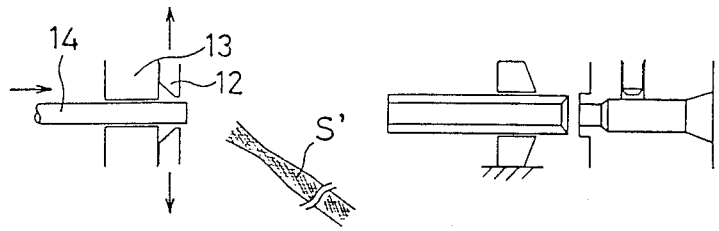

(9) As shown in FIG. 2(J), as soon as the clamp 12 is opened, the discharging rod 14 is pushed into the receiving hole 13A to push the remaining shielding wires S' out of the receiver 13. Alternatively, the remaining shielding wires S' may be removed by hand.

The holding aperture 2 of the cable holder 1 may be made in the form of a sleeve which is interchangeable so that different diameters and shoulders are available. The sleeve 11 of correspondingly different diameter and length may also be used for a given cable size and a desired length of exposed shield portion.

With the above machine, a desired length of shield portion may be removed automatically by merely inserting into the machine a cable whose sheath has been removed from the shield portion, thus not only increasing the productivity but also minimizing damage to the core wires.

While a preferred embodiment of the invention has been described using specific terms, such description is provided for illustrative purposes only, and it is to be understood that changes and variations may be made without departing the spirit and scope of the invention as recited in the appended claims.

What is claimed is:

1. A shield wires removing machine having a cable holder with a holding aperture, a sleeve movable through a blade body, and a clamp with a variable opening all arranged concentrically around an axial line for receiving and removing a length of exposed shield wires from a cable which has core wires, soft shield wires, and a sheath, which comprises:

said cable holder being movable along said axial line, and said holding aperture has a diameter sufficiently large to receive a cable;

a pressure bar provided at right angles to said holding aperture for holding by pressure said cable in place within said holding aperture;

a shielding wires guide communicating with said holding aperture via a shoulder portion and having a diameter substantially equal to a diameter of exposed shield portion;

a cylindrical flange provided at an end of said shielding wires guide and able to abut said sleeve;

said blade body has an opening whose edge forms a circular blade in which said cylindrical flange is able to fit;

said sleeve has a diameter sufficiently large to receive said exposed shield portion; and said clamp is movable along said axial line and has elements which are movable in radial directions to at least two positions; a first position where they catch said exposed shield portion with core wires therein and a second position where they catch an exposed shield portion with no core wires therein.

2. A shielding wires removing machine for automatically removing a desired length of shielding wires from a shielded cable, which comprises:

a base;

a blade body secured to said base and having a blade aperture whose edge forms a circular blade;

a movable sleeve able to slide in said blade aperture along a longitudinal axis;

a movable cable holder provided in front of said fixed blade body and having a holding aperture and a shield guide concentrically about said longitudinal axis, said shield guide having a diameter sufficiently large to receive an exposed shield portion of said shielded cable but too small to receive said shielded cable;

a pressure bar disposed in a side hole provided at right angles to said holding aperture for holding by pressure said shielded cable in place within said holding aperture; and a movable clamp provided behind said fixed blade body and having a plurality of clamp elements movable in radial directions to form a variable opening concentrically about said longitudinal axis.

3. A shielding wires removing machine for automatically removing a desired length of shielding wires from a shielded cable, which comprises:

a base;

a fixed blade body secured to said base and having a blade aperture whose edge forms a circular blade;

a movable sleeve able to slide in said blade aperture along a longitudinal axis;

a movable cable holder provided in front of said fixed blade body and having a holding aperture and a shield guide concentrically about said longitudinal axis, said shield guide having a diameter sufficiently large to receive an exposed shield portion of said shielded cable but too small to receive said shielded cable;

a cylindrical flange provided at an end of said shield guide and having an outside diameter slightly smaller than a diameter of said blade aperture;

a pressure bar disposed in a side hole provided at right angles to said holding aperture for holding by pressure said shielded cable in place within said holding aperture; and a movable clamp provided behind said fixed blade body and having a plurality of clamp elements movable in radial directions to form a variable opening concentrically about said longitudinal axis.

4. The shield wires removing machine of claim 3, which further comprises a receiver provided behind said clamp and having an receiving aperture sufficiently large to receive said exposed shield portion.

5. The shield wires removing machine of claim 4, which further comprises a discharge rod able to fit in said receiving aperture for pushing a remaining shielding wires out of said receiver and said clamp.

6. The shield wires removing machine of claim 3, wherein said holding aperture has a tapered mouth for facilitating insertion of said shielded cable.

* * * * *